(12) United States Patent
Ulrich et al.

(10) Patent No.: US 8,468,136 B2
(45) Date of Patent: Jun. 18, 2013

(54) EFFICIENT DATA BACKUP

(75) Inventors: Robert Ulrich, San Jose, CA (US);
Steve Ko, San Francisco, CA (US);
Pavel Cisler, Los Gatos, CA (US); Eric Weiss, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 276 days.

(21) Appl. No.: 11/760,597

(22) Filed: Jun. 8, 2007

(65) Prior Publication Data

US 2008/0307018 A1    Dec. 11, 2008

(51) Int. Cl.
*G06F 17/00* (2006.01)

(52) U.S. Cl.
USPC .......................... 707/646; 707/647; 707/610

(58) Field of Classification Search
USPC .................. 707/204, E17.044, 609, 646, 647
See application file for complete search history.

(56) References Cited

U.S. PATENT DOCUMENTS

| | | | |
|---|---|---|---|
| 5,150,473 A * | 9/1992 | Zulch | 707/E17.012 |
| 5,163,148 A | 11/1992 | Walls | |
| 5,276,867 A | 1/1994 | Kenley et al. | |
| 5,349,658 A | 9/1994 | O'Rourke et al. | |
| 5,369,570 A | 11/1994 | Parad | |
| 5,664,186 A | 9/1997 | Bennett et al. | |
| 5,680,562 A | 10/1997 | Conrad et al. | |
| 5,736,974 A | 4/1998 | Selker | |
| 5,745,669 A | 4/1998 | Hugard et al. | |
| 5,754,178 A | 5/1998 | Johnston et al. | |
| 5,758,359 A * | 5/1998 | Saxon | 707/204 |
| 5,790,120 A | 8/1998 | Lozares et al. | |
| 5,818,936 A | 10/1998 | Mashayekhi | |
| 5,819,032 A | 10/1998 | De Vries et al. | |
| 5,819,292 A | 10/1998 | Hitz et al. | |
| 5,831,617 A | 11/1998 | Bhukhanwala | |
| 5,832,526 A | 11/1998 | Schuyler | |
| 5,961,605 A | 10/1999 | Deng et al. | |
| 5,987,566 A | 11/1999 | Vishlitzky et al. | |
| 6,006,227 A | 12/1999 | Freeman et al. | |
| 6,023,506 A | 2/2000 | Ote et al. | |
| 6,097,313 A | 8/2000 | Takahashi et al. | |

(Continued)

FOREIGN PATENT DOCUMENTS

| | | |
|---|---|---|
| EP | 0629950 | 12/1994 |
| EP | 1152352 | 11/2001 |

(Continued)

OTHER PUBLICATIONS

"Apple Previews Mac OS X Leopard," Aug. 7, 2006 [online] [retrieved on Nov. 26, 2007] Retrieved from the Internet:<URL:http://www.apple.com/pr/library/2006/aug/07leopard.html>, pp. 1-2.

(Continued)

*Primary Examiner* — Wilson Lee
*Assistant Examiner* — Thuy Bui
(74) *Attorney, Agent, or Firm* — Fish & Richardson P.C.

(57) ABSTRACT

Systems and methods are provided for storing and restoring digital data. In some implementations, a method is provided. The method includes identifying an item for segmented backup according to one or more specified criteria, and performing a first backup of the item including separating the item into a plurality of first parts prior to backing up the data and including separately storing each part. Other embodiments of this aspect include corresponding systems, apparatus, computer program products, and computer readable media.

27 Claims, 5 Drawing Sheets

U.S. PATENT DOCUMENTS

| | | | |
|---|---|---|---|
| 6,112,318 A | 8/2000 | Jouppi et al. | |
| 6,167,532 A | 12/2000 | Wisecup | |
| 6,188,405 B1 | 2/2001 | Czerwinski et al. | |
| 6,269,381 B1 * | 7/2001 | St. Pierre et al. | 707/999.2 |
| 6,366,988 B1 | 4/2002 | Skiba et al. | |
| 6,396,500 B1 | 5/2002 | Qureshi et al. | |
| 6,397,308 B1 | 5/2002 | Ofek et al. | |
| 6,424,626 B1 | 7/2002 | Kidambi et al. | |
| 6,460,055 B1 | 10/2002 | Midgley et al. | |
| 6,604,118 B2 | 8/2003 | Kleiman et al. | |
| 6,625,704 B2 | 9/2003 | Winokur | |
| 6,629,129 B1 | 9/2003 | Bookspan et al. | |
| 6,636,937 B2 | 10/2003 | Peter | |
| 6,638,313 B1 | 10/2003 | Freeman et al. | |
| 6,711,572 B2 | 3/2004 | Zakharov et al. | |
| 6,714,201 B1 | 3/2004 | Grinstein et al. | |
| 6,714,952 B2 | 3/2004 | Dunham et al. | |
| 6,725,427 B2 | 4/2004 | Freeman et al. | |
| 6,728,735 B1 | 4/2004 | Fong | |
| 6,768,999 B2 | 7/2004 | Prager et al. | |
| 6,785,751 B1 | 8/2004 | Connor | |
| 6,785,786 B1 | 8/2004 | Gold et al. | |
| 6,857,001 B2 | 2/2005 | Hitz et al. | |
| 6,892,211 B2 | 5/2005 | Hitz et al. | |
| 6,901,493 B1 | 5/2005 | Maffezzoni | |
| 6,918,124 B1 | 7/2005 | Novik et al. | |
| 6,948,039 B2 | 9/2005 | Biessener et al. | |
| 6,959,368 B1 | 10/2005 | St. Pierre et al. | |
| 7,072,916 B1 | 7/2006 | Lewis et al. | |
| 7,099,900 B1 | 8/2006 | Bromley et al. | |
| 7,103,740 B1 * | 9/2006 | Colgrove et al. | 707/204 |
| 7,111,136 B2 * | 9/2006 | Yamagami | 707/999.204 |
| 7,133,902 B2 | 11/2006 | Saha et al. | |
| 7,155,486 B2 | 12/2006 | Aoshima et al. | |
| 7,174,352 B2 | 2/2007 | Kleiman et al. | |
| 7,185,028 B2 | 2/2007 | Lechner | |
| 7,200,617 B2 | 4/2007 | Kibuse | |
| 7,222,194 B2 | 5/2007 | Kano et al. | |
| 7,318,134 B1 | 1/2008 | Oliveira et al. | |
| 7,386,801 B1 | 6/2008 | Horvitz et al. | |
| 7,418,619 B1 | 8/2008 | Uhlmann et al. | |
| 7,434,177 B1 | 10/2008 | Ording et al. | |
| 7,440,125 B2 | 10/2008 | Maekawa et al. | |
| 7,483,693 B2 | 1/2009 | Lueng et al. | |
| 7,505,762 B2 | 3/2009 | Onyon et al. | |
| 7,518,611 B2 | 4/2009 | Boyd et al. | |
| 7,558,930 B2 | 7/2009 | Kitamura et al. | |
| 7,590,668 B2 | 9/2009 | Kathuria et al. | |
| 7,624,133 B1 * | 11/2009 | Ojalvo | 707/999.202 |
| 7,630,021 B2 | 12/2009 | Matsuzaka et al. | |
| 7,660,817 B2 | 2/2010 | Smith et al. | |
| 7,669,141 B1 | 2/2010 | Pegg | |
| 7,676,689 B1 | 3/2010 | Shioyama et al. | |
| 7,711,771 B2 * | 5/2010 | Kirnos | 709/203 |
| 7,734,594 B2 | 6/2010 | Wang | |
| 7,809,687 B2 | 10/2010 | Cisler et al. | |
| 7,809,688 B2 | 10/2010 | Cisler et al. | |
| 7,853,566 B2 | 12/2010 | Cisler et al. | |
| 7,853,567 B2 | 12/2010 | Cisler et al. | |
| 7,856,424 B2 | 12/2010 | Cisler et al. | |
| 7,860,839 B2 | 12/2010 | Cisler et al. | |
| 7,934,064 B1 * | 4/2011 | Per et al. | 707/641 |
| 8,010,900 B2 | 8/2011 | Hart et al. | |
| 8,099,392 B2 | 1/2012 | Paterson et al. | |
| 8,166,415 B2 | 4/2012 | Cisler et al. | |
| 8,229,897 B2 * | 7/2012 | Cannon et al. | 707/679 |
| 2001/0047368 A1 | 11/2001 | Oshinsky et al. | |
| 2002/0023198 A1 | 2/2002 | Kokubun et al. | |
| 2002/0046220 A1 | 4/2002 | Freeman et al. | |
| 2002/0054158 A1 | 5/2002 | Asami | |
| 2002/0063737 A1 | 5/2002 | Feig et al. | |
| 2002/0080180 A1 | 6/2002 | Mander et al. | |
| 2002/0156921 A1 | 10/2002 | Dutta et al. | |
| 2002/0160760 A1 | 10/2002 | Aoyama | |
| 2002/0174283 A1 | 11/2002 | Lin | |
| 2003/0016248 A1 | 1/2003 | Hayes Ubillos | |
| 2003/0018878 A1 | 1/2003 | Dorward et al. | |
| 2003/0050940 A1 | 3/2003 | Robinson | |
| 2003/0063128 A1 | 4/2003 | Salmimaa et al. | |
| 2003/0065687 A1 * | 4/2003 | Momiji et al. | 707/204 |
| 2003/0097640 A1 | 5/2003 | Abrams et al. | |
| 2003/0122874 A1 | 7/2003 | Dieberger et al. | |
| 2003/0126247 A1 * | 7/2003 | Strasser et al. | 707/200 |
| 2003/0131007 A1 | 7/2003 | Schirmer et al. | |
| 2003/0135650 A1 | 7/2003 | Kano et al. | |
| 2003/0137540 A1 | 7/2003 | Klevenz et al. | |
| 2003/0167380 A1 | 9/2003 | Green | |
| 2003/0172937 A1 | 9/2003 | Faries et al. | |
| 2003/0195903 A1 | 10/2003 | Manley et al. | |
| 2003/0220949 A1 | 11/2003 | Witt et al. | |
| 2004/0066414 A1 | 4/2004 | Czerwinski et al. | |
| 2004/0073560 A1 | 4/2004 | Edwards | |
| 2004/0078641 A1 | 4/2004 | Fleischmann | |
| 2004/0088331 A1 | 5/2004 | Therrien et al. | |
| 2004/0117459 A1 | 6/2004 | Fry | |
| 2004/0125137 A1 | 7/2004 | Stata et al. | |
| 2004/0133575 A1 | 7/2004 | Farmer et al. | |
| 2004/0139396 A1 | 7/2004 | Gelernter et al. | |
| 2004/0143652 A1 | 7/2004 | Grannan et al. | |
| 2004/0163009 A1 | 8/2004 | Goldstein et al. | |
| 2004/0167942 A1 | 8/2004 | Oshinsky et al. | |
| 2004/0175000 A1 | 9/2004 | Caronni | |
| 2004/0193953 A1 | 9/2004 | Callahan et al. | |
| 2004/0199826 A1 | 10/2004 | Bertram et al. | |
| 2004/0210608 A1 | 10/2004 | Lee et al. | |
| 2004/0220980 A1 | 11/2004 | Forster | |
| 2004/0228493 A1 | 11/2004 | Ma | |
| 2004/0235523 A1 | 11/2004 | Schrire et al. | |
| 2004/0236769 A1 | 11/2004 | Smith et al. | |
| 2004/0236916 A1 | 11/2004 | Berkowitz et al. | |
| 2004/0267700 A1 | 12/2004 | Dumais et al. | |
| 2005/0010955 A1 | 1/2005 | Elia et al. | |
| 2005/0071390 A1 | 3/2005 | Midgley et al. | |
| 2005/0091596 A1 | 4/2005 | Anthony et al. | |
| 2005/0102695 A1 | 5/2005 | Musser | |
| 2005/0108253 A1 | 5/2005 | Metsatahti et al. | |
| 2005/0138081 A1 | 6/2005 | Alshab et al. | |
| 2005/0144135 A1 | 6/2005 | Juarez et al. | |
| 2005/0149577 A1 | 7/2005 | Okada et al. | |
| 2005/0165867 A1 | 7/2005 | Barton et al. | |
| 2005/0187992 A1 | 8/2005 | Prahlad et al. | |
| 2005/0204186 A1 | 9/2005 | Rothman et al. | |
| 2005/0216527 A1 | 9/2005 | Erlingsson | |
| 2005/0246398 A1 | 11/2005 | Barzilai et al. | |
| 2005/0262168 A1 | 11/2005 | Helliker et al. | |
| 2005/0262377 A1 | 11/2005 | Sim-Tang | |
| 2006/0026218 A1 | 2/2006 | Urmston | |
| 2006/0041603 A1 | 2/2006 | Paterson et al. | |
| 2006/0041823 A1 | 2/2006 | Wolfgang et al. | |
| 2006/0053332 A1 | 3/2006 | Uhlmann et al. | |
| 2006/0064444 A1 * | 3/2006 | van Ingen et al. | 707/204 |
| 2006/0064634 A1 | 3/2006 | Dettinger et al. | |
| 2006/0080521 A1 | 4/2006 | Barr et al. | |
| 2006/0085792 A1 | 4/2006 | Traut | |
| 2006/0085817 A1 | 4/2006 | Kim et al. | |
| 2006/0101384 A1 | 5/2006 | Sim-Tang et al. | |
| 2006/0106893 A1 * | 5/2006 | Daniels et al. | 707/204 |
| 2006/0117309 A1 | 6/2006 | Singhal et al. | |
| 2006/0137010 A1 | 6/2006 | Kramer et al. | |
| 2006/0143250 A1 | 6/2006 | Peterson et al. | |
| 2006/0156246 A1 | 7/2006 | Williams et al. | |
| 2006/0161861 A1 | 7/2006 | Holecek et al. | |
| 2006/0218363 A1 | 9/2006 | Palapudi | |
| 2006/0248294 A1 | 11/2006 | Nedved et al. | |
| 2006/0253470 A1 | 11/2006 | Friedman et al. | |
| 2007/0027935 A1 | 2/2007 | Haselton et al. | |
| 2007/0030528 A1 | 2/2007 | Quaeler et al. | |
| 2007/0038884 A1 * | 2/2007 | Campbell et al. | 714/4 |
| 2007/0043790 A1 | 2/2007 | Kryger | |
| 2007/0070066 A1 | 3/2007 | Bakhash | |
| 2007/0078910 A1 | 4/2007 | Bopardikar | |
| 2007/0088702 A1 | 4/2007 | Fridella et al. | |
| 2007/0094312 A1 | 4/2007 | Sim-Tang | |
| 2007/0106978 A1 * | 5/2007 | Felts | 717/124 |
| 2007/0136381 A1 | 6/2007 | Cannon et al. | |
| 2007/0136389 A1 | 6/2007 | Bergant et al. | |
| 2007/0156772 A1 | 7/2007 | Lechner | |

| | | | |
|---|---|---|---|
| 2007/0168497 | A1 | 7/2007 | Locker et al. |
| 2007/0185879 | A1 | 8/2007 | Roublev et al. |
| 2007/0185922 | A1 | 8/2007 | Kapoor et al. |
| 2007/0192386 | A1 | 8/2007 | Fries et al. |
| 2007/0266007 | A1 | 11/2007 | Arrouye et al. |
| 2007/0271263 | A1 | 11/2007 | Merrild |
| 2007/0271303 | A1 | 11/2007 | Menendez et al. |
| 2007/0288536 | A1 | 12/2007 | Sen et al. |
| 2008/0016576 | A1 | 1/2008 | Ueda et al. |
| 2008/0022393 | A1 | 1/2008 | Waltermann et al. |
| 2008/0028007 | A1 | 1/2008 | Ishii et al. |
| 2008/0033922 | A1 | 2/2008 | Cisler et al. |
| 2008/0033969 | A1* | 2/2008 | Koo et al. ............... 707/100 |
| 2008/0034004 | A1 | 2/2008 | Cisler et al. |
| 2008/0034011 | A1 | 2/2008 | Cisler et al. |
| 2008/0034013 | A1 | 2/2008 | Cisler et al. |
| 2008/0034016 | A1 | 2/2008 | Cisler et al. |
| 2008/0034017 | A1* | 2/2008 | Giampaolo et al. ......... 707/204 |
| 2008/0034018 | A1 | 2/2008 | Cisler et al. |
| 2008/0034019 | A1 | 2/2008 | Cisler et al. |
| 2008/0034039 | A1 | 2/2008 | Cisler et al. |
| 2008/0059894 | A1 | 3/2008 | Cisler et al. |
| 2008/0065663 | A1 | 3/2008 | Farlee et al. |
| 2008/0070496 | A1 | 3/2008 | Jackson |
| 2008/0077808 | A1 | 3/2008 | Teicher et al. |
| 2008/0082578 | A1 | 4/2008 | Hogue et al. |
| 2008/0091655 | A1 | 4/2008 | Gokhale et al. |
| 2008/0126441 | A1 | 5/2008 | Giampaolo et al. |
| 2008/0126442 | A1 | 5/2008 | Cisler et al. |
| 2008/0141029 | A1 | 6/2008 | Culver |
| 2008/0168184 | A1 | 7/2008 | Freedman et al. |
| 2008/0168245 | A1 | 7/2008 | De Atley et al. |
| 2008/0168391 | A1 | 7/2008 | Robbin et al. |
| 2008/0177961 | A1* | 7/2008 | McSharry et al. ............ 711/162 |
| 2008/0208630 | A1 | 8/2008 | Fors et al. |
| 2008/0214163 | A1 | 9/2008 | Onyon et al. |
| 2008/0216011 | A1 | 9/2008 | Gould |
| 2008/0229037 | A1 | 9/2008 | Bunte et al. |
| 2008/0250342 | A1 | 10/2008 | Clark et al. |
| 2008/0285754 | A1 | 11/2008 | Kezmann |
| 2008/0307000 | A1 | 12/2008 | Paterson et al. |
| 2008/0307017 | A1 | 12/2008 | Lyons et al. |
| 2008/0307019 | A1 | 12/2008 | Weiss et al. |
| 2008/0307020 | A1 | 12/2008 | Ko et al. |
| 2008/0307175 | A1 | 12/2008 | Hart et al. |
| 2008/0307333 | A1 | 12/2008 | McInerney et al. |
| 2008/0307347 | A1 | 12/2008 | Cisler et al. |
| 2008/0310633 | A1 | 12/2008 | Brown et al. |
| 2009/0254591 | A1 | 10/2009 | Weiss et al. |
| 2009/0307333 | A1 | 12/2009 | Welingkar et al. |
| 2010/0017855 | A1 | 1/2010 | Johnson et al. |
| 2010/0217929 | A1 | 8/2010 | Kirshenbaum et al. |
| 2011/0016089 | A1 | 1/2011 | Freedman et al. |
| 2011/0083088 | A1 | 4/2011 | Cisler et al. |
| 2011/0083098 | A1 | 4/2011 | Cisler et al. |
| 2011/0087976 | A1 | 4/2011 | Cisler et al. |
| 2011/0302502 | A1 | 12/2011 | Hart et al. |
| 2012/0124507 | A1 | 5/2012 | Paterson et al. |
| 2012/0198383 | A1 | 8/2012 | Cisler et al. |

FOREIGN PATENT DOCUMENTS

| | | |
|---|---|---|
| EP | 1582982 | 10/2005 |
| WO | 01/06356 | 1/2001 |
| WO | 02/101540 | 12/2002 |
| WO | 2005/045756 | 5/2005 |
| WO | 2008/019237 | 2/2008 |

OTHER PUBLICATIONS

"Aulaclic: Unit 6. The Recycle Bin," Nov. 2005 [online] [retrieved on Nov. 26, 2007] Retrieved from the Internet:<URL:http://www.teacherclick.com/winxp/t_6_1.htm>, pp. 1-2.

Bonwick, Jeff, "ZFS the Last Word in File Systems," [online] [retrieved on Jan. 22, 2008] Retrieved from the Internet:<URL:http://opensolaris.org/os/community/zfs/docs/zfs.pdf>, 34 pages.

Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemac/index.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.

Tittel, Ed. "An EAZ Way to Restore Crippled and Inoperable Systems." ChannelWeb. Apr. 25, 2005. http://www.crn.com/white-box/161502165.

"What's New in Word 2002." Wellesly College Information Services Computing Documentation, Jan. 2002, http://www.wellesley.edu/Computing/Office02/Word02/word02.html. Accessed 812/2008.

International Search Report and Written Opinion, PCT/US2007/074653, Aug. 14, 2008, 14 pages.

International Search Report and Written Opinion, PCT/US2008/065146, Oct. 31, 2008, 21 pages.

Bott, Ed, "Windows XP Backup Made Easy," Jul. 14, 2003, Microsoft.

Engst, Adam, "Retrospect 6.0: Powerful Backup Program Adds Panther Compatibility and Enterprise Features", Jun. 1, 2004, MacWorld.

Harder, Bobbie, "Microsoft Windows XP System Restore," Apr. 2001, MSDN.

"MSDN Academic Alliance Developer Center, Curriculum Repository Glossary," [online]. Retrieved from the Internet <URL: http://www.academicresourcecenter.net/curriculum/glossary.aspx>, retrieved on Apr. 22, 2009, 4 pages.

"StorageSync: Backup, Restore, & Synchronization Software User's Guide", SimpleTech, 2003.

International Search Report and Written Opinion, PCT/US2008/066212, Mar. 9, 2009, 26 pages.

International Search Report and Written Opinion, PCT/US2007/074863 Apr. 21, 2009, 20 pages.

Communication pursuant to Article 94(3) EPC for Application No. EP 07 799 899.5, dated May 14, 2009, 2 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.

Communication pursuant to Article 94(3) EPC for Application No. EP 07 799 899.5, dated Oct. 7, 2009, 4 pages. (0040EP1).

Microsoft-TechNet, "Using Encrypting File System," Nov. 3, 2005, Microsoft, 40 pages.

In-link files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/In.html, 5 pages.

Godfrey, Michael et al., "Using Original Analysis to Detect Merging and Splitting of Source Code Entities," IEEE Transactions on Software Engineering, vol. 31, No. 2. Feb. 2005. pp. 166-181.

Extended European Search Report, European Application No. 11184579.8, Nov. 17, 2011, 6 pages.

Office Action dated Feb. 29, 2012 from related Chinese Application No. 200880024710.0, 11 pages.

Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.

Extended International Search Report and Written Opinion, EP 11171738.5, Aug. 29, 2011, 5 pages.

Examination Report from European Application No. 07 813 605.8 dated Oct. 27, 2011, 5 pages.

Examination Report from European Application No. 07 813 540.7 dated Oct. 27, 2011, 5 pages.

Communication pursuant to Article 94(3) EPC for Application No. EP 07 813 540.7, dated Jun. 23, 2009, 2 pages.

* cited by examiner

EFFICIENT DATA BACKUP

TECHNICAL FIELD

The disclosed implementations relate generally to storing and restoring digital data.

BACKGROUND

Modern graphical user interfaces allow a large number of graphical objects or items to be displayed on a display screen at the same time. Operating systems, e.g., Apple Mac OS®, provide user interfaces in which a number of graphical user interface windows can be displayed, overlapped, resized, moved, configured, and reformatted according to the needs of a user or a particular application. Taskbars, menus, virtual buttons, and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save the file's current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file returned to a previous version. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens the document again, it might not be possible to automatically undo any previous edits.

SUMMARY

Systems and methods are provided for storing and restoring digital data. In general, in one aspect, a method is provided. The method includes identifying an item for segmented backup according to one or more specified criteria, and performing a first backup of the item including separating the item into a plurality of first parts prior to backing up the data and including separately storing each part. Other embodiments of this aspect include corresponding systems, apparatus, computer program products, and computer readable media.

Implementations of the aspect can include one or more of the following features. The aspect can further include identifying changes to the item and performing a second backup of the item including identifying changed data in the item relative to the first backup, and storing the changed data as one or more second parts of the item. Identifying the item for segmented backup can include determining whether a size of the item exceeds a specified threshold or determining whether the item has been changed within a specified time.

Performing the first backup of the item can further include generating an index where the index includes information for assembling the plurality of first parts. Performing the second backup of the item can further include generating an updated index, where the updated index includes information for assembling the plurality of first parts and the second parts of the item. Performing the second backup of the item can further include generating links associating file system representations of the unchanged parts of the item in the second backup with corresponding parts in the first backup of the item. The item can be a mail database.

In general, in one aspect, a method is provided. The method includes identifying an item to be included in a backup, determining whether the item is a moved item, including identifying one or more identifiers for the item, comparing the one or more identifiers with items in a previous backup, and when the item is a moved file, backing up the item including linking the item to the corresponding item in the previous backup. Other embodiments of this aspect include corresponding systems, apparatus, computer program products, and computer readable media.

Implementations of the aspect can include one or more of the following features. Identifying one or more identifiers can include identifying a physical storage location of the item. Identifying one or more identifiers can include identifying a creation data of the item. Comparing the one or more identifiers can include traversing second items in one or more previous backups and identifying any matching identifiers to the item. The item can be determined to be a moved item when a second item in the previous backup is identified as having a same physical storage location and creation date as the item.

Particular embodiments of the subject matter described in this specification can be implemented to realize one or more of the following advantages. Backups can be performed efficiently including storing only a portion of an item representing changed data in the backup data. Backups can also be performed efficiently including determining whether an item is new or moved such that moved items are represented in the backup as a reference to an earlier backup.

The details of the various aspects of the subject matter described in this specification are set forth in the accompanying drawings and the description below. Other features, aspects, and advantages of the invention will become apparent from the description, the drawings, and the claims.

DETAILED DESCRIPTION

Figure 1:
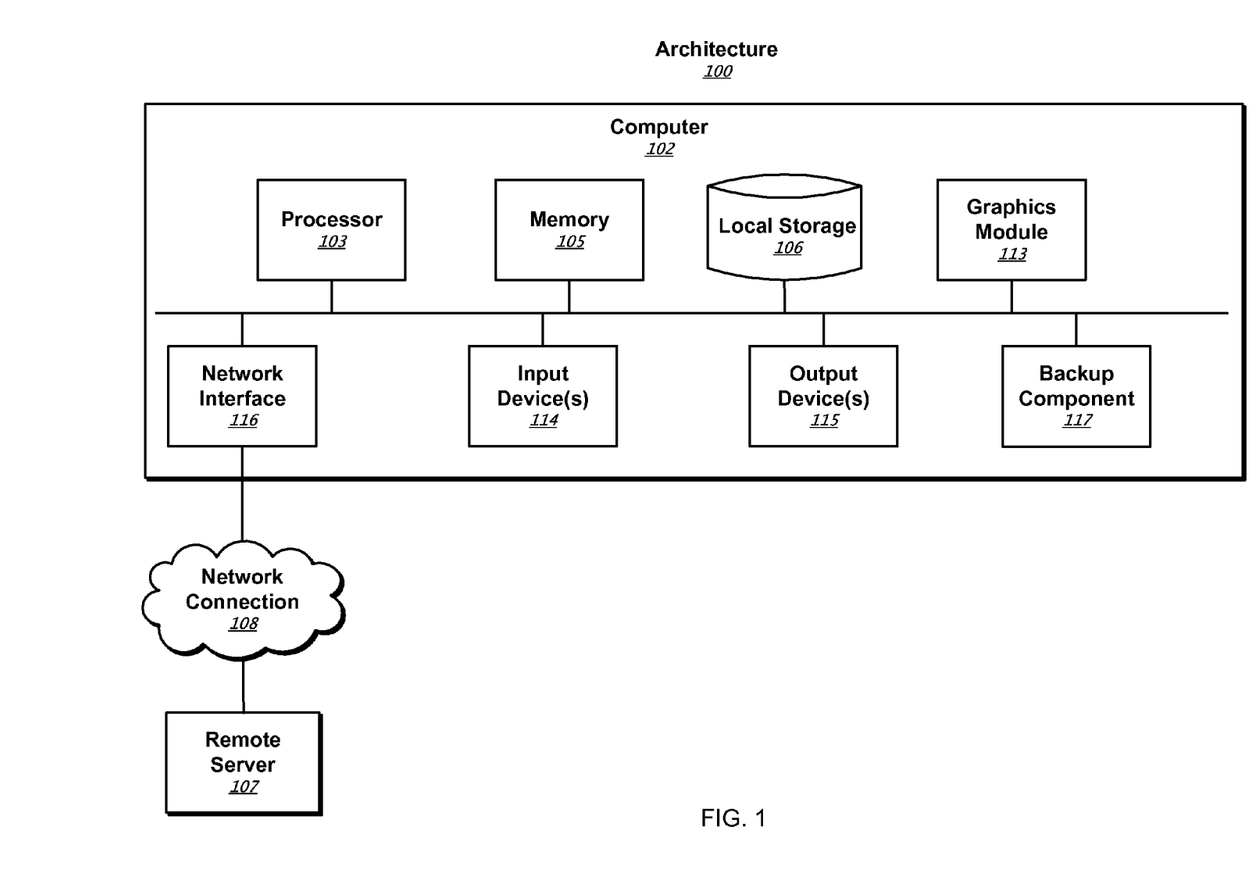
FIG. 1 is a block diagram showing an example system.

FIG. 1 is a block diagram of a system 100. The system 100 can be used, for example, for electronic backup and restoration of encrypted data in a user interface view. As used herein, a view refers to an item, element or other content, capable of being presented in a user interface that can be subjected to a backup operation by a backup component 117 included in the system 100. For example, a user interface view can contain any number of icons, files, folders, application state information and/or machine state information, etc. In some implementations, the backup operation includes generating a link to an item or a portion of an item in a previous backup.

The system 100 includes a personal computer 102, communicatively coupled to a remote server 107 using a network interface 116, and a network 108 (e.g., local area network, wireless network, Internet, intranet, etc.). The computer 102 generally includes a processor 103, memory 105, one or more input devices 114 (e.g., keyboard, mouse, etc.), and one or more output devices 115 (e.g., a display device). A user interacts with the system 100 using the input and output devices 114, 115. The system 100 also includes various hardware elements. The system 100 can include hardware, software, and combinations of the two.

The computer 102 also includes a local storage device 106 and a graphics module 113 (e.g., a graphics card) for storing information and generating graphical objects, respectively. The local storage device 106 can be a computer-readable medium. The computer-readable medium can be a machine-readable storage device, a machine-readable storage substrate, a memory device, a composition of matter effecting a machine-readable propagated signal, or a combination of one or more of them.

While electronic backups of data are described herein with respect to a personal computer 102, it should be apparent that the disclosed implementations can be incorporated in, or integrated with, any electronic device, including without limitation, portable and desktop computers, servers, electronics, media players, game devices, mobile phones, email devices, personal digital assistants (PDAs), embedded devices, televisions, other consumer electronic devices, etc.

Systems and methods are provided for electronic backup and restoration of data. The systems and methods can be stand-alone or otherwise integrated into a more comprehensive application. In the materials presented below, an integrated system and method for electronic backup and restoration of data is disclosed.

One of ordinary skill in the art will recognize that the engines, methods, processes and the like that are described can themselves be an individual process or application, part of an operating system, a plug-in, an application or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described below.

A system and method for link management can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes a backup component 117 that allows for the storage of versions of the computer's files or other items (e.g., restoring a view including past state of a file, application, application data, parameters, settings, and the like), for example within the local storage 106 or in an external storage repository. For example, the backup component 117 can capture at least one earlier version of a user interface view and allow a user to initiate a restoration based on the earlier version. As used herein, a view refers to an item, or other content, capable of being presented in a user interface, that can be subjected to a backup operation by the backup component 117. For example, a user interface view can contain any number of elements such as icons, files, folders, application state information, and/or machine state information, etc. In one implementation, the backup component 117 also allows a user to select any of the stored versions and use the selected version to initiate a restoration of that version in the computer.

Though discussion is made with reference to modifying a user interface view, those of ordinary skill will recognize that such a view can be based on various data structures, files, processes, and other aspects of information management. It follows that modification to file structures, data and the like is also contemplated in order to achieve the modification to the user interface view. In other words, while the restoration of the user interface view from one state to another is the most apparent change from the user's perspective, this is accomplished through the corresponding changes in the underlying system content.

Figure 2:
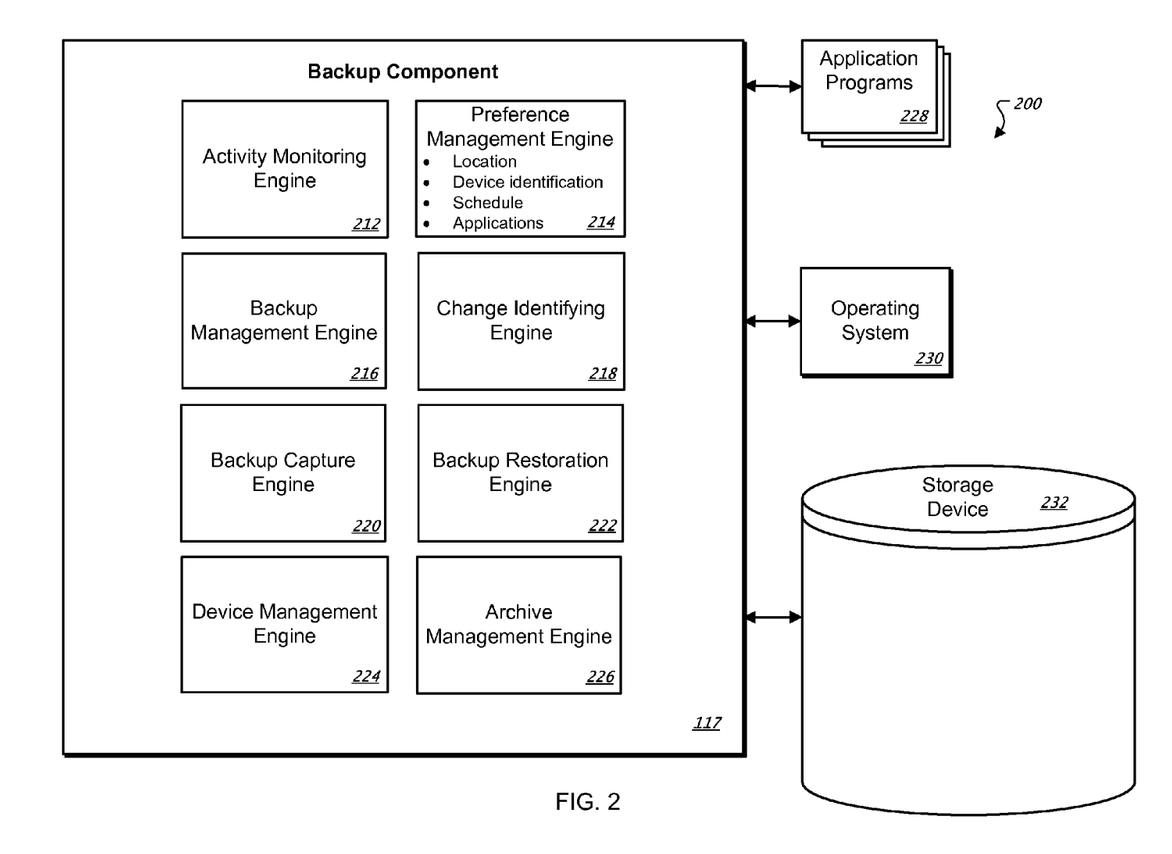
FIG. 2 is a block diagram showing an example of a backup component and interactions with the backup component.

FIG. 2 is a block diagram of an exemplary architecture 200 for enabling the backup and restoration of data. The data can include, for example, application files, application data, settings, parameters or the like, such as those associated with a set of applications 228. The backup component 117 provides backup and restoration capability for the system 100. Many different items or elements can be the subject of a backup operation in the system 100. For example, folders, files, items, information portions, directories, images, system parameters, playlists, address books, e-mails, e-mail folders, application states, and the like all can be candidates for inclusion in an archive as backup data. Other types of data can be included as backup data.

In some implementations, the backup component 117 uses a storage device 232. The storage device 232 can be an internal or external resource, or a combination of the two. Any number of local and/or external storage devices can be used by the backup component 117 for storing backup data. In some implementations, the backup component 117 can view storage devices designated for use in storing backup data as a single memory bank.

In one implementation, the backup component 117 stores the backup data in a format corresponding to a file system structure. Backup data can be stored incrementally during a backup operation where backup data is periodically written to a particular storage device.

In one implementation, one copy of original data (e.g., folders, files, items, information portions, directories, images, system parameters, playlists, address books, e-mails, e-mail folders, application states, preferences, and the like) is stored in the system as backup data (e.g., an original version of the data). When one or more subsequent sets of backup data, or versions, of the data are generated through subsequent backup operations, the backup data can contain only the differences between a current data version and the prior backup data, thereby saving storage space. In some implementations, the storage devices 204 and 232 can be used to store the original backup data as well as links pointing to the original backup data. The links can be hard links which reference, or point to, physical data, or as another example can be symbolic links that reference another file on the storage device (e.g., by name or location).

In another implementation, the backup component 117 runs as a background task on an operating system 230, where the task is generally not visible to the user. The backup component 117 can be can be configured to run across multiple user accounts.

The backup component 117 includes an activity monitoring engine 212. In one implementation, the activity monitoring engine 212 monitors for changes within data (e.g., files or application states) targeted for inclusion in backup operations. A change can also include the addition of new files or other data structures and the modification or deletion of existing ones.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through the activity monitoring engine's interaction with the applications 228. The activity monitoring engine 212 can, for example, create a list of modified elements (e.g., files) to be used when a backup operation is eventually triggered. In one implementation, the activity monitoring engine 212 can monitor the system for periods of inactivity. The activity monitoring engine 212 can then trigger a backup operation during a period of time in which the backup operation will not cause a system slowdown for an active user.

A preference management engine 214 specifies some operating parameters of the backup component 117. In one implementation, the preference management engine 214 contains user-specified and/or system default application parameters for the backup component 117. These can include settings for the details of capturing and storing the views. For example, the preference management engine 214 can determine the frequency of backup operations, the storage location for the backup data, the types of elements (e.g., files or other items) that are eligible for inclusion in backup operations, and the events which trigger a backup operation (periodic or event-driven, etc.).

In one implementation, the preference management engine 214 can detect that a new storage device is being added to the system and prompt the user whether it should be included as a backup repository. Files and other items can be scheduled for a backup operation due to location (e.g. everything on the C: drive and within D:/photos), a correlation with specific applications (e.g. all pictures, music, e-mail, address book and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of view versions performed by the backup component 117. For example, the backup management engine 216 can trigger the activity monitoring engine 212 to monitor for activities that satisfy one or more criteria specified in the preference management engine 214 for initiating a backup operation.

A change identifying engine 218 locates specific element (e.g., files or other items) to determine if data associated with the elements has changed. The change identifying engine 218 can be capable of discerning a substantive change from a non-substantive change. For example, the change identifying engine 218 can identify a loss of data associated with a user's current view. In one implementation, the change identifying engine 218 traverses a target set of files or other items, comparing a previous version to the current version to determine whether or not a modification has occurred.

A backup capture engine 220 locates views (e.g., elements, files or other items) that are to be included in a backup operation. The backup capture engine 220 can invoke the activity monitoring engine 212 and/or the change identifying engine 218, for example, to generate a capture list identifying data to be included in a next backup operation. The backup capture engine 220 can then store copies of listed data in one or more targeted storage repositories. The backup capture engine 220 can track multiple versions of elements or items included in the backup repository.

The backup component 117 includes a backup restoration engine 222 to restore previous views (e.g. versions of files, data, or other items). In one implementation, the backup restoration engine 222 provides a user interface (e.g., a graphical user interface) where a user can select the item(s) to be restored.

A device management engine 224 handles the addition and removal of individual storage devices to be used for archiving backup data. In one implementation, the preference management engine 214 obtains user settings regarding the identification of individual storage devices for use in archiving. These settings can include, but are not limited to, particular segments of individual devices to use, a threshold capacity which can be filled with backup data, and particular devices for storing backup data corresponding to individual applications. The device management engine 224 records the storage device settings obtained by the preference management engine 214, which are used to monitor storage device activity. In one implementation, the device management engine 224 can alert the user when a new device has been added to the system. In one implementation, the device management engine 224 can alert the user when an archive-enabled device has been removed from the system. In yet another implementation, the device management engine 224 can alert the user when an archive-enabled device is nearing its threshold storage capacity setting.

An archive management engine 226 tracks where backup data is being stored. In one implementation, the archive management engine 226 obtains settings from the preference management engine 224. The settings can include, but are not limited to, methods to be used to remove older or otherwise unnecessary backup data. The settings can establish one or more criteria for deleting backup data from particular backup operations, for instance in the event of storage capacity being reached or on a regular basis. In one implementation, the archive management engine 226 alerts the user when backup data are unavailable, e.g., because a device has gone offline. In another implementation, the archive management engine 226 bars a user from viewing backup data corresponding to another user's backup data due to system permissions settings.

In this example, an external storage device 232 can be used by the backup component 117 for archiving. Any number of storage devices can be used by the backup component 117. For example, a second external storage device can be used as an overflow repository in the event that the device 232 reaches capacity. In another implementation, different storage devices contain the backup version and incremental updates of data belonging to different applications or to different users on the system 100. As another example, two or more storage devices can be responsible for storing backup data from separate applications in the system 100.

In one implementation, the storage device can be network based. For example, the system can store backup data on a remote server (e.g., using a media access control (MAC) address to a storage location). Alternatively, the user can store backup data on a local storage network such as a storage area network (SAN). In one implementation, the remote network storage is a primary storage location for backup data of an archives In an alternative implementation, the remote network storage is an alternative storage location for backup data. For example, if the user's primary storage location is not available (e.g., a local storage device such as a Firewire drive), then the backup data can be stored on the remote network storage.

The backup data can be compressed and/or encrypted. An example of a compression technique is the ZIP file format for data compression and archiving. An example of an encryption technique is the RSA algorithm for public key encryption. Other compression techniques or encryption techniques could be used. In one implementation, the backup data stored from each backup operation has a structure that mimics a typical file system structure, such that the archived versions from each distinct backup operation can be perused using a standard file system viewing utility.

In one implementation, if multiple users make use of the backup component 117 on a single system (e.g., system 100), each user can select to keep separate backup data archives. Access to an individual user's archives can be password protected or otherwise held in a secure manner. In one implementation, the backup data within the user's archive contains the same read/write permissions as the original data item. In one implementation, the archive management engine 226 inherits the data items' original permissions and indexes the archived contents accordingly. For example, using these permissions settings, the archive management engine 226 can deny a user access to a copy of a data item when the user would not have authorization to view the original data item. In another implementation, the user can establish permissions or encryption techniques specifically for the backup data archive as a whole. User permissions and encryption settings can be user-selectable from within the preference management engine 214. The preference management engine 214 would then transfer the settings to the archive management engine 226 for storage.

Figure 3A:
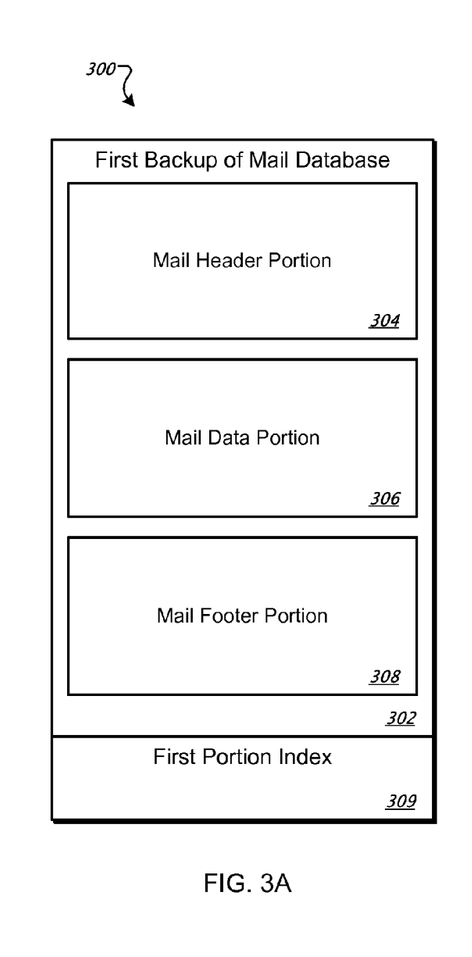
FIGS. 3A-B are block diagrams showing examples of item portions in a backup that link to a previous backup.
Figure 3B:
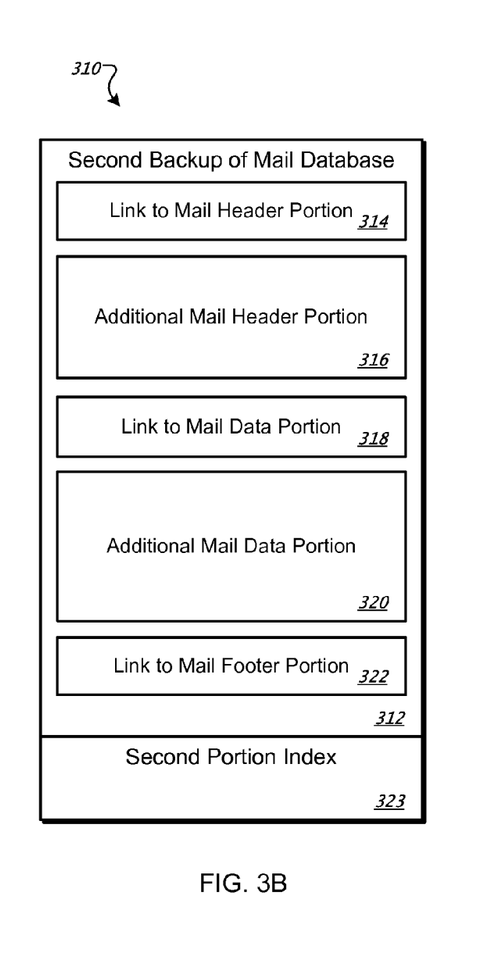

FIGS. 3B and 3A are block diagrams showing examples of item portions in a backup 310 that link to item portions in a previous backup 300, respectively. In some implementations, the backup component 117 can perform a backup of a large item, such as a mail database 302. The large item can change frequently. For example, the mail database 302 can repeatedly receive new mail messages that change the contents of the mail database item 302.

The attributes of the mail database 302 and/or conditions of the changes made to the mail database 302 can trigger a segmented backup of the mail database 302 when the backup component 117 performs a backup operation on the mail database 302. For example, if the mail database 302 meets a particular size criterion, such as being at least 500 megabytes in size, then the backup component 117 can perform a segmented backup of the mail database 302. Alternatively or in addition, if the changes to the mail database 302 meet a frequency criterion, such as a particular number of changes occurring within a specified time period, then the backup component 117 can perform a segmented backup of the mail database 302.

Performing the segmented backup includes separating the mail database 302 into multiple portions. For example, the backup component 117 can separate the mail database 302 into a mail header portion 304, a mail data portion 306, and a mail footer portion 308. In some implementations, the portions are separated based on the conditions of updates made to the mail database 302. For example, the mail footer portion 308 can include a portion of the mail database 302 that changes infrequently. Alternatively or in addition, the portions can be separated based on functional areas of the mail database 302. For example, the mail header portion 304 can include a list of mail messages in the mail database 302 and the mail data portion 306 can contain the mail messages included in the mail database 302.

The segmented backup of the mail database 302 also includes a first portion index 309. The first portion index 309 can be generated by the backup component 117 when separating the mail database 302 into portions. The first portion index 309 includes instructions for assembling the portions into the mail database 302. For example, when restoring the mail database 302, the backup component can use the first index portion 309 to reconstitute the mail database as a single data structure in the file system.

In some implementations, backup component 117 generates a subsequent backup of the mail database 302, for example, backup 310. For example, a user can request a backup, an event can trigger a backup (e.g., the modification, addition, or removal of an item), or backup operations can periodically be performed (e.g., according to a specified schedule). When performing the subsequent backup, the backup component 117 identifies changes between the state of the current mail database and the first mail database 302 in the first backup 300. For example, the mail data can include additional mail messages and the list of mail messages in the mail header can have changed accordingly.

The backup component 117 stores changed portions including an additional mail index portion 316 and an additional mail data portion 320 in the second mail database backup 312. Since the portions of the item from the first backup 300 are unchanged for the second backup operation, they can be stored in the second backup 310 as references to the corresponding portions in the first backup 300. The backup component 117 generates links for the unchanged portions including a link 314 to the mail header portion 304, a link 318 to the mail data portion 306, and a link 322 to the mail footer portion 308. The backup component 117 also generates a second portion index 323. The second portion index 323 includes information for assembling the portions 304, 306, 308, 316, and 320 into the mail database 312.

In some implementations, the backup component 117 can perform backups over a network. The backup component 117 can retrieve the first portion index 309 over the network. The backup component 117 can (e.g., using a rolling checksum) determine which portions, if any, have changed since the last backup or another prior backup to which an item links. The backup component 117 sends the changed portions over the network to the storage device.

Figure 4:
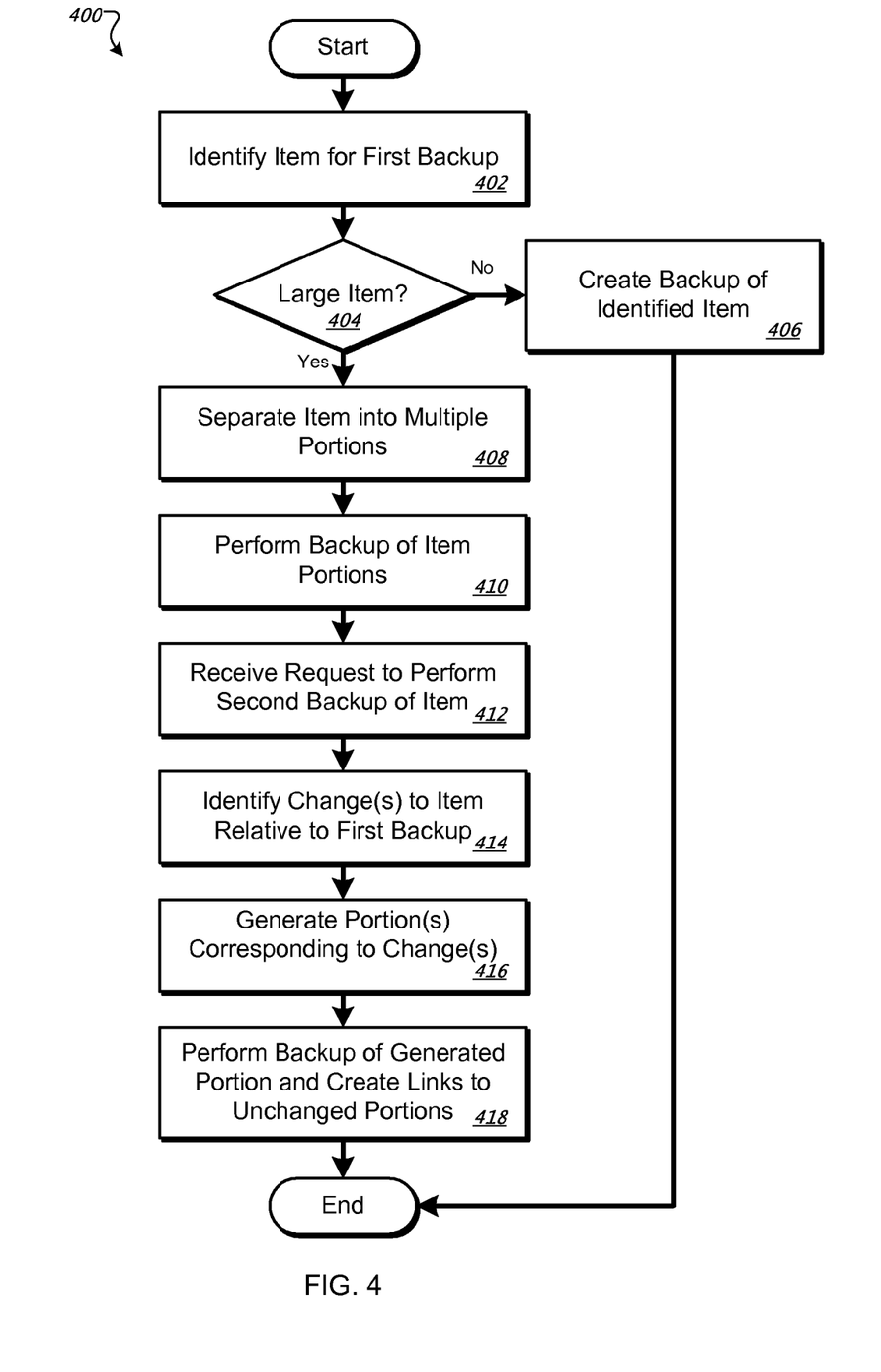
FIG. 4 is a flow chart showing an example of a process for performing backup operations for large items.

FIG. 4 is a flow chart showing an example process 400 for performing backup operations for large items. For convenience, the process 400 will be described with respect to a system (e.g., system 100) that performs the process 400. The system identifies (402) an item for a first backup operation. The item can be e.g., a file, folder, state, or other data associated with the system.

The system determines (404) whether the item is a large item. The determination is based on one or more criteria. For example, the backup component (e.g., backup component 117) can designate the item (e.g., mail database 302) for segmented backup based on the size of the item and/or the frequency with which the content in the item changes.

If the system does not designate the item for segmented backup, then the system creates (406) a backup of the item. Otherwise, if the system designates the item for segmented backup, then the system separates (408) the item into multiple portions. For example, a backup component can separate a mail database (e.g., mail database 302) into the portions (e.g., the portions 304, 306, and 308 shown in FIG. 3A). A first index portion (e.g., first index portion 309) is generated relating the separated portions to the whole item.

The system performs (410) a first backup of the separated item portions. For example, as shown in FIG. 3A, for the mail database 302 the backup component stores the portions 304, 306, and 308 along with the first index portion 309 to form the first backup 300. The backup data corresponding to the first backup is stored on a particular backup device designated for an archive of backup data.

The system receives (412) a request to perform a second backup operation. For example, the backup component can receive a user input or can automatically request a second backup according to particular criteria (e.g., a backup event or specified backup schedule).

The system identifies (414) changes to the item relative to the first backup. For example, the backup component can compare the item data (e.g., the second mail database 312) to the item data in the first backup (e.g. the first mail database in first backup 300) to determine changes between the two. In some implementations, where the first mail database backup includes links to a previous backup, the backup component can compare the second mail database to an earlier backup (or backup portion) to which the first mail database links.

The system generates (416) additional portions corresponding to the identified changes to the item data. For example, the backup component can generate the additional portions 316 and 320, corresponding to the additions made to the mail header portion 304 and the mail data portion 306, respectively as shown in FIGS. 3A-3B. Additionally, first index portion 309 is updated to identify the relationship of all portions to the item (e.g., as second index portion 323).

The system performs (418) a backup of the generated portions and creates links to the unchanged portions in the first backup. For example, the backup component stores the newly generated portions 316 and 320 in the second mail database 312 and creates links 314, 318, and 322 to the portions 304, 306, and 308 in the first backup 300. The second backup includes the second mail database and the second index portion. Consequently, the entire item, which can be very large, is not stored as a whole. Instead only portions corresponding to the new data are stored in the second backup.

Figure 5:
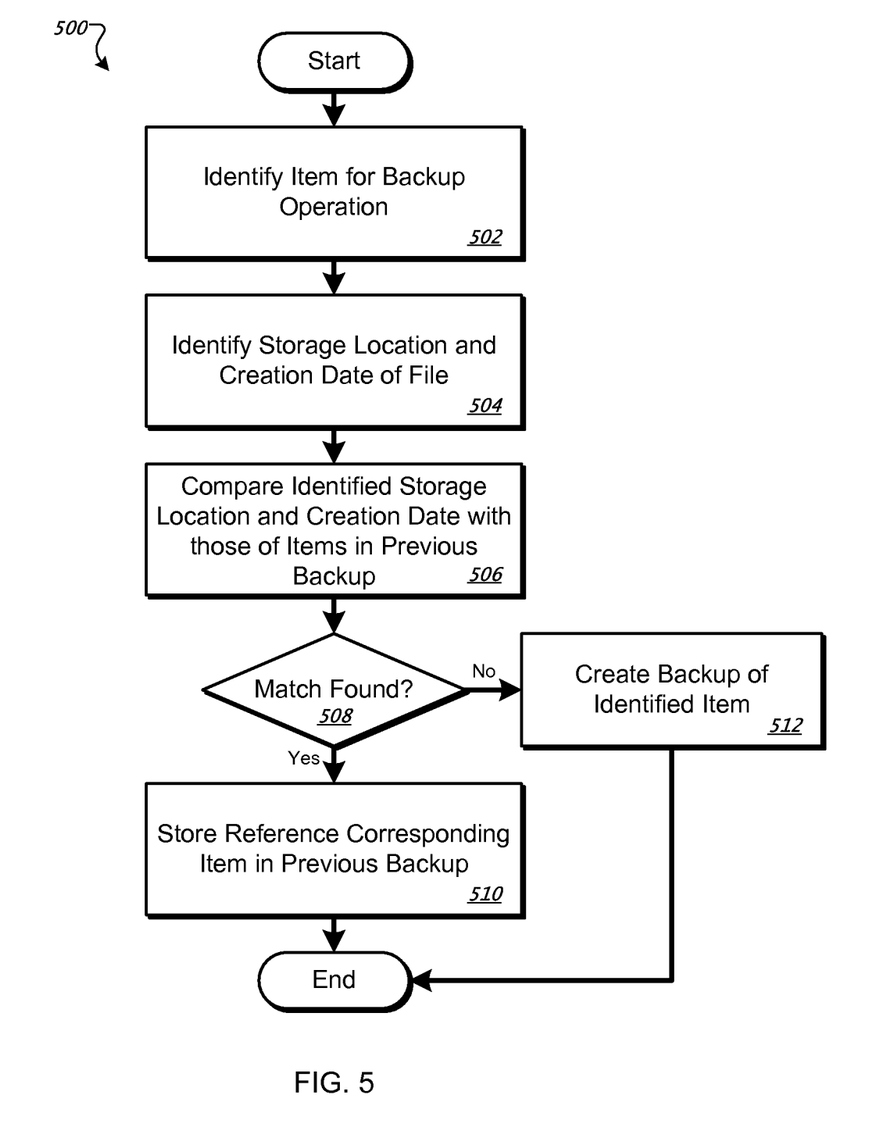
FIG. 5 is a flow chart showing an example of a process for including a moved item in a backup operation.

FIG. 5 is a flow chart showing an example process 500 for including a moved item in a backup operation. For convenience, the process 500 will be described with respect to a system (e.g., system 100) that performs the process 500. The system identifies (502) an item for inclusion in a backup operation. For example, the backup component 117 can receive an input from a user requesting a backup of an item, the backup can be triggered periodically according to a specified schedule, or the backup can be triggered by an event.

The system identifies (504) one or more identifiers associated with the item, such as a storage location and/or an item creation date and time. For example, the backup device 117 can identify a physical location on the local storage 106 at which the item is stored. The physical location on the storage device 106 can be represented, for example, by sector and block identifiers on a hard disk or by a unique identifier used by the storage device 106 (e.g., an i-node value). In addition, the backup component 117 can identify the date and time that the item was placed at the identified location (e.g., a creation date for the item).

The system compares (506) the one or more item identifiers to item identifiers in backup data from one or more previous backups. For example, the backup component 117 can search for the identified physical location and/or the identified creation date and time in backup data from earlier backup operations.

If the system identifies (508) a matching identifier or set of identifiers, then the system stores (510) a reference to the corresponding item identified in a previous backup. For example, the backup operation can store the item as a link to the previous version. If the system does not identify (508) a match, then the system creates (512) a backup of the item (e.g., the data of the item, for example a file, is stored as backup data).

For example, the backup component 117 can find, in a previous backup, an item having the same physical location identifier and creation date, but stored at a different location in the file system. The matching identifiers indicate that the item was moved to a new location, rather than being a new item. The backup component 117 generates a link during the backup operation to the matching item in the previous backup.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it could prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what can be claimed, but rather as descriptions of features specific to particular implementations of the subject matter. Certain features that are described in this specification in the context of separate embodiments may also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
    identifying an item for segmented backup according to one or more specified criteria, the criteria including a size of the item or a change frequency of the item;
    performing a first backup of the item using one or more computing devices, including:
        separating the item into a plurality of first parts prior to backing up the item, and
        separately storing each part,
        where separating the item into a plurality of first parts includes identifying first parts of the item to be separated according to a segmentation criteria, the segmentation criteria associated with a data structure of the item where the segmentation criteria is unrelated to an available number of storage devices, where separating the item into a plurality of first parts includes identifying the first parts according to functional areas of the data structure of the item; and
    performing a second backup of the item, including:
        identifying changed data in the item relative to the first backup;
        separating the changed data into a plurality of second parts; and
        storing the changed item data of the plurality of second parts without storing the unchanged data of the item.

2. The method of claim 1, where identifying the item for segmented backup comprises:
    determining whether a size of the item exceeds a specified threshold; or
    determining whether the item has been changed within a specified time.

3. The method of claim 1, where performing the first backup of the item further comprises:
    generating an index where the index includes information for assembling the plurality of first parts.

4. The method of claim 2, where performing the second backup of the item further comprises:
    generating an updated index, where the updated index includes information for assembling the plurality of first parts and the second parts of the item.

5. The method of claim 1, where performing the second backup of the item further comprises:

generating links associating file system representations of the unchanged parts of the item in the second back up with corresponding first parts in the first backup of the item.

6. The method of claim 1, where the item is a mail database.

7. The method of claim 1, where the first parts are stored on a single storage device.

8. The method of claim 1, where separating the item into a plurality of first parts includes identifying first parts according to how frequently portions of the data in the item change.

9. The method of claim 1, where the second parts are stored in addition to the first parts.

10. A computer program product, encoded on a non-transitory computer-readable medium, operable to cause data processing apparatus to perform operations comprising:
identifying an item for segmented backup according to one or more specified criteria, the criteria including a size of the item or a change frequency of the item;
performing a first backup of the item including:
separating the item into a plurality of first parts prior to backing up the item, and
separately storing each part,
where separating the item into a plurality of first parts includes identifying first parts of the item to be separated according to a segmentation criteria, the segmentation criteria associated with a data structure of the item where the segmentation criteria is unrelated to an available number of storage devices, where separating the item into a plurality of first parts includes identifying the first parts according to functional areas of the data structure of the item; and
performing a second backup of the item, including:
identifying changed data in the item relative to the first backup;
separating the changed data into a plurality of second parts; and
storing the changed item data of the plurality of second parts without storing the unchanged data of the item.

11. The computer program product of claim 10, where separating the item into a plurality of first parts includes identifying first parts according to how frequently portions of the data change.

12. The computer program product of claim 10, where identifying the item for segmented backup comprises:
determining whether a size of the item exceeds a specified threshold; or
determining whether the item has been changed within a specified time.

13. The computer program product of claim 10, where performing the first backup of the item further comprises:
generating an index where the index includes information for assembling the plurality of first parts.

14. The computer program product of claim 12, where performing the second backup of the item further comprises:
generating an updated index, where the updated index includes information for assembling the plurality of first parts and the second parts of the item.

15. The computer program product of claim 10, where performing the second backup of the item further comprises:
generating links associating file system representations of the unchanged parts of the item in the second back up with corresponding first parts in the first backup of the item.

16. The computer program product of claim 10, where the item is a mail database.

17. The computer program product of claim 10, where the first parts are stored on a single storage device.

18. The computer program product of claim 10, where the second parts are stored in addition to the first parts.

19. A system comprising:
one or more processors; and
a non-transitory computer-readable medium including one or more sequences of instructions which, when executed by the one or more processors, causes:
identifying an item for segmented backup according to one or more specified criteria, the criteria including a size of the item or a change frequency of the item;
performing a first backup of the item using one or more computing devices, including:
separating the item into a plurality of first parts prior to backing up the item, and
separately storing each part,
where separating the item into a plurality of first parts includes identifying first parts of the item to be separated according to a segmentation criteria, the segmentation criteria associated with a data structure of the item where the segmentation criteria is unrelated to an available number of storage devices, where separating the item into a plurality of first parts includes identifying the first parts according to functional areas of the data structure of the item; and
performing a second backup of the item, including:
identifying changed data in the item relative to the first backup;
separating the changed data into a plurality of second parts; and
storing the changed item data of the plurality of second parts without storing the unchanged data of the item.

20. The system of claim 19, where the instructions that cause identifying the item for segmented backup comprise instructions that cause:
determining whether a size of the item exceeds a specified threshold; or determining whether the item has been changed within a specified time.

21. The system of claim 19, where the instructions that cause performing the first backup of the item further comprise instructions that cause:
generating an index where the index includes information for assembling the plurality of first parts.

22. The system of claim 20, where the instructions that cause performing the second backup of the item further comprise instructions that cause:
generating an updated index, where the updated index includes information for assembling the plurality of first parts and the second parts of the item.

23. The system of claim 19, where the instructions that cause performing the second backup of the item further comprise instructions that cause:
generating links associating file system representations of the unchanged parts of the item in the second back up with corresponding first parts in the first backup of the item.

24. The system of claim 19, where the item is a mail database.

25. The system of claim 19, where the first parts are stored on a single storage device.

26. The system of claim 19, where the instructions that cause separating the item into a plurality of first parts include instructions that cause identifying first parts according to how frequently portions of the data in the item change.

27. The system of claim 19, where the second parts are stored in addition to the first parts.

* * * * *

UNITED STATES PATENT AND TRADEMARK OFFICE
CERTIFICATE OF CORRECTION

| | | |
|---|---|---|
| PATENT NO. | : 8,468,136 B2 | Page 1 of 1 |
| APPLICATION NO. | : 11/760597 | |
| DATED | : June 18, 2013 | |
| INVENTOR(S) | : Ulrich et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 268 days.

Signed and Sealed this
Sixth Day of January, 2015

Michelle K. Lee
*Deputy Director of the United States Patent and Trademark Office*